United States Patent
Van Den Aker

(10) Patent No.: US 7,954,810 B2
(45) Date of Patent: Jun. 7, 2011

(54) METHOD AND DEVICE FOR TRANSPORTING A SHEET

(75) Inventor: Martinus Cornelus Adrianus Van Den Aker, Tilburg (NL)

(73) Assignee: Beiler Beheer B.V. (NL)

( * ) Notice: Subject to any disclaimer, the term of this patent is extended or adjusted under 35 U.S.C. 154(b) by 981 days.

(21) Appl. No.: 10/589,153

(22) PCT Filed: Feb. 10, 2005

(86) PCT No.: PCT/NL2005/000100
§ 371 (c)(1),
(2), (4) Date: Aug. 11, 2006

(87) PCT Pub. No.: WO2005/077799
PCT Pub. Date: Aug. 25, 2005

(65) Prior Publication Data
US 2007/0170644 A1    Jul. 26, 2007

(30) Foreign Application Priority Data

Feb. 12, 2004 (NL) .................... 1025467
Feb. 27, 2004 (NL) .................... 1025595

(51) Int. Cl.
*B65H 5/00* (2006.01)
(52) U.S. Cl. .................. 271/225; 271/184
(58) Field of Classification Search .......... 271/225, 271/184, 69, 270, 3.18, 3.19; 198/689.1, 198/457.01, 457.03, 575, 605, 606
See application file for complete search history.

(56) References Cited

U.S. PATENT DOCUMENTS

| | | | |
|---|---|---|---|
| 3,456,773 A * | 7/1969 | Titmas, Jr. | 198/370.09 |
| 3,687,348 A | 8/1972 | Scheib | |
| 4,318,513 A | 3/1982 | Martinez | |
| 4,619,358 A * | 10/1986 | May et al. | 198/457.03 |
| 5,188,010 A * | 2/1993 | Borchardt et al. | 83/175 |
| 5,197,262 A * | 3/1993 | Katz et al. | 53/550 |
| 5,282,528 A * | 2/1994 | Hudson | 198/451 |

(Continued)

FOREIGN PATENT DOCUMENTS

| | | |
|---|---|---|
| CH | 660719 | 6/1987 |
| DE | 2824433 | 12/1979 |
| DE | 19539494 | 4/1996 |
| JP | 62-48333 | 3/1987 |
| JP | 10258932 | 9/1998 |
| NL | 1014891 | 10/2001 |

OTHER PUBLICATIONS

PCT Search Report for Application No. PCT/NL2005/00100 dated Dec. 10, 2005.

*Primary Examiner* — Stefanos Karmis
*Assistant Examiner* — Thomas A Morrison
(74) *Attorney, Agent, or Firm* — Ryan A. Schneider, Esq.; Troutman Sanders LLP

(57) ABSTRACT

A device for manufacturing a crosslaid fiber web including a first conveyor belt and a second conveyor belt, which are oriented in two different directions, wherein the second conveyor belt adjoins a side of the first conveyor belt. During operation of the device, the first conveyor belt transports longitudinal fiber web segments, which are conveyed to the second conveyor belt in a conveyance region. During transportation by the first conveyor belt, a conveyance area of the longitudinal fiber web segments projects with respect to the side of the first conveyor belt. The device comprises a guiding belt for supporting a portion of this conveyance area, in order to guarantee that, in the conveyance region, the longitudinal fiber web segments may be conveyed to the second conveyor belt in a completely outstretched fashion.

10 Claims, 3 Drawing Sheets

U.S. PATENT DOCUMENTS

| | | | |
|---|---|---|---|
| 5,433,430 A * | 7/1995 | Straessler et al. | 271/225 |
| 5,695,185 A * | 12/1997 | Bell | 271/185 |
| 5,769,302 A | 6/1998 | Richert et al. | |
| 5,848,345 A * | 12/1998 | Stemmle | 399/401 |
| 6,217,692 B1 * | 4/2001 | Kling | 156/229 |
| 6,425,969 B1 | 7/2002 | Van den Akker | |
| 6,446,789 B1 | 9/2002 | Goodman | |
| 6,843,365 B2 * | 1/2005 | Baker | 198/813 |
| 6,907,978 B2 * | 6/2005 | Evans et al. | 198/370.09 |
| 7,361,246 B2 * | 4/2008 | Chang et al. | 156/177 |
| 2003/0175067 A1 * | 9/2003 | Pearce et al. | 402/73 |

* cited by examiner

METHOD AND DEVICE FOR TRANSPORTING A SHEET

BENEFIT CLAIMS

This application is a US National Stage of International Application No. PCT/NL2005/000100 filed 10 Feb. 2005, which claims the benefit of both NL 1025467, filed 12 Feb. 2004, and NL 1025595, filed 27 Feb. 2004.

FIELD OF THE INVENTION

The present invention relates in general to transporting a sheet, wherein the sheet is successively transported in two different directions.

The present invention relates in particular to transporting a sheet, wherein the sheet is successively transported by a first carrier and a second carrier, wherein the carriers are movable in different directions, and wherein, at a certain moment, the sheet is conveyed from the first carrier to the second carrier.

BACKGROUND OF THE INVENTION

According to the state of the art, a method for transporting a sheet comprises the following steps:
  moving the sheet in a first direction by applying a first carrier which is movable in the first direction and which is capable of retaining the sheet by means of a surface force, wherein a retainer area of the sheet is retained by the first carrier and a conveyance area of the sheet projects with respect to the first carrier;
  conveying the sheet from the first carrier to a second carrier which is movable in a second direction and which is capable of retaining the sheet by means of a surface force, wherein the sheet is put in a conveyance position by the first carrier, in which position the complete conveyance area overlaps the second carrier; and
  moving the sheet in the second direction by applying the second carrier.

The known method is applied as part of a manufacturing process of a so-called crosslaid fiber web, for example. Such a fiber web comprises two or more layers of fibers, wherein the directions of the fibers in the various layers are at an angle with respect to each other, for example an angle of 90°.

In the following, as an example, a manufacturing process of a crosslaid fiber web is described, wherein the fibers of the various layers of the crosslaid fiber web are at an angle of 90° with respect to each other. For the purpose of the manufacturing process of the crosslaid fiber web, a device having a first endless conveyor belt and a second endless conveyor belt is applied. The second conveyor belt adjoins a side of the first conveyor belt in a close-fitting fashion, and extends at an angle of 90° with respect to the first conveyor belt.

For the purpose of manufacturing the crosslaid fiber web, a longitudinal fiber web is positioned on both conveyor belts. A longitudinal fiber web is a fiber web in which the fibers extend in one direction, in particular a direction substantially parallel to side edges of the fiber web. The longitudinal fiber webs are reeled off of a storage reel or the like, and are retained by the conveyor belts. Retaining of the longitudinal fiber webs may take place in various manners. According to a usual possibility, a suction force is applied, wherein an underpressure is prevailing at a backside of a supporting surface of the conveyor belts, while the conveyor belt is provided with a plurality of passage openings.

At the first conveyor belt, a knife is arranged, which extends at an angle of 90° with respect to the first conveyor belt. When the knife is applied, segments are continuously cut off of the longitudinal fiber web on the first conveyor belt, which are subsequently transported further by the first conveyor belt. When the cut-off segments are at a position where the second conveyor belt adjoins the first conveyor belt, which position is indicated as conveyance position, the first conveyor belt is stopped and the segments are conveyed to the second conveyor belt. In this way, the segments end up on the longitudinal fiber web which is located on the second conveyor belt. It will be clear that the movements of the conveyor belts are adapted to each other in such a way that successive segments end up on the longitudinal fiber web in an adjoining fashion, so that a continuous crosslaid fiber web is obtained.

The crosslaid fiber web is ready when the longitudinal fiber web and the segments are connected to each other. Fixing the segments on the longitudinal fiber web can be realized in various manners, for example by means of laminating.

For the purpose of conveying the segments from the first conveyor belt to the second conveyor belt, the segments are positioned on the first conveyor belt in such a way that only a retainer area of the segments rests on the first conveyor belt, and that a conveyance area of the segments projects with respect to the first conveyor belt. More in particular, the conveyance area of the segments projects with respect to the side of the first conveyor belt which is adjoined by the second conveyor belt. In this way, it is achieved that the conveyance area of the segments is located on the second conveyor belt when the segments are in the conveyance position. As soon as the suction force between the segments and the first conveyor belt is released, and the second conveyor belt is activated to retain the segments, this second conveyor belt is capable of pulling off the segments of the first conveyor belt in a simple manner and directly transporting the segments further. It is possible that a third conveyor belt or a roller is provided, which serves for letting the conveyance of the segments from the first conveyor belt to the second conveyor belt take place in a good and secure manner by pressing the segments against the longitudinal fiber web.

It has appeared in practice that a situation may occur in which a crosslaid fiber web which is obtained by means of the manufacturing process as described above shows irregularities. In this respect, a cause appears to be the fact that the conveyance area of the segments does not always end up on the longitudinal fiber web on the second conveyor belt in a proper way. For example, a small area at the edge of the conveyance area may be curled, as a result of which this small area is folded double when the segment is connected to the longitudinal fiber web.

SUMMARY OF THE INVENTION

It is an objective of the present invention to provide a method for transporting a cut-off segment, wherein measures are taken for guaranteeing that the conveyance of the segment from the first conveyor belt to the second conveyor belt takes place in a proper fashion, i.e. without curling or folding of a portion of the edge of the segment taking place.

The objective is in general achieved by a method for transporting a sheet, comprising the following steps:
  moving the sheet in a first direction by applying a first carrier which is movable in the first direction and which is capable of retaining the sheet by means of a surface force, wherein a retainer area of the sheet is retained by the first carrier and a conveyance area of the sheet projects with respect to the first carrier;
  conveying the sheet from the first carrier to a second carrier which is movable in a second direction and which is capable of retaining the sheet by means of a surface force, wherein the sheet is put in a conveyance position by the first carrier, in which position the complete conveyance area overlaps the second carrier; and moving the sheet in the second direction by applying the second carrier;

wherein, during the movement of the sheet in the first direction, guidance of a guidance area of the sheet, which comprises at least a portion of the conveyance area of the sheet, takes place by applying guiding means, which guidance is cancelled when the sheet has reached the conveyance position.

According to an important aspect of the present invention, when the method according to the present invention is applied for manufacturing a crosslaid fiber web, a guidance area of the segments is guided when the segments are taken to the conveyance position by the first conveyor belt. The guidance area comprises at least a portion of the conveyance area of the segments, which projects with respect to the first conveyor belt. When the segments have reached the conveyance position, the guidance is cancelled, so that the segments may be conveyed to the second conveyor belt. By guiding at least a portion of the conveyance area of the segments, it is achieved that this area does not curl or fold, so that the segments may be laid on the longitudinal fiber web on the second conveyor belt in a completely planar condition. An advantageous consequence is that the crosslaid fiber web which is formed on the basis of the longitudinal fiber web and the segments has a regular structure, and all of the crosslaid fiber web is useful for further applications.

BRIEF DESCRIPTION OF THE DRAWINGS

The present invention will now be explained in greater detail on the basis of the following description of the invention with reference to the figures, in which equal reference signs indicate equal or similar parts, and in which.

DETAILED DESCRIPTION OF THE INVENTION

Figure 1:
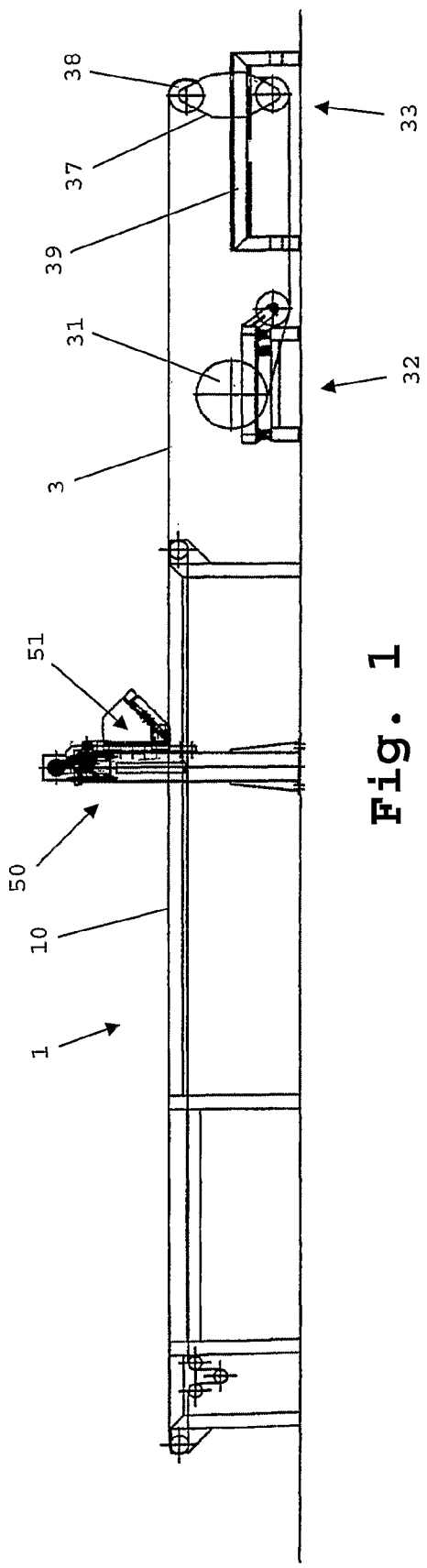
FIG. 1 is a side view of a longitudinal section in a first direction of a device for manufacturing a crosslaid fiber web according to a preferred embodiment of the present invention.
Figure 2:
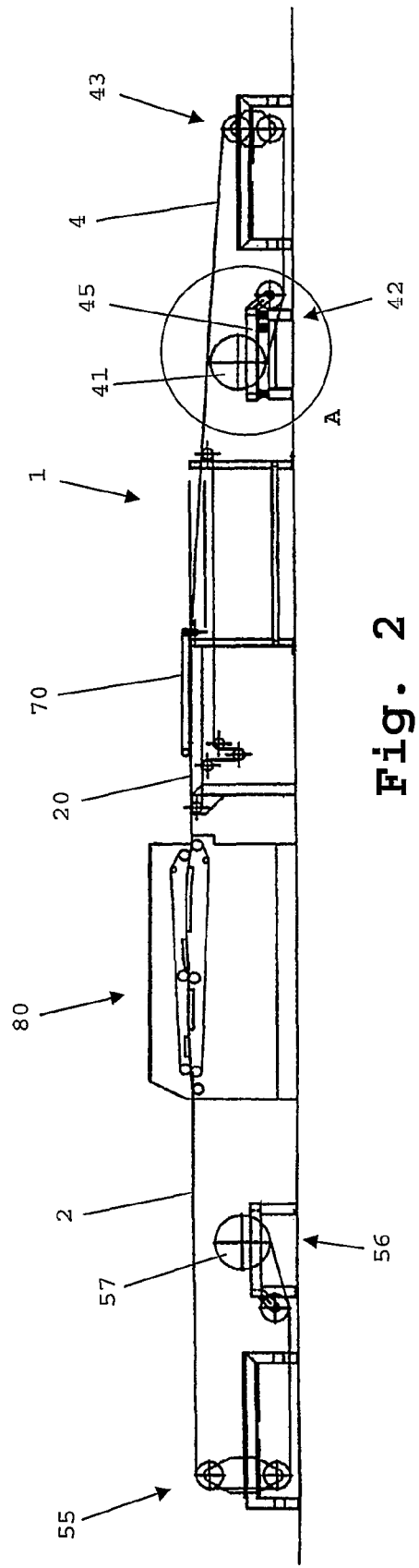
FIG. 2 is a side view of a longitudinal section in a second direction of the device shown in FIG. 1.
Figure 3:
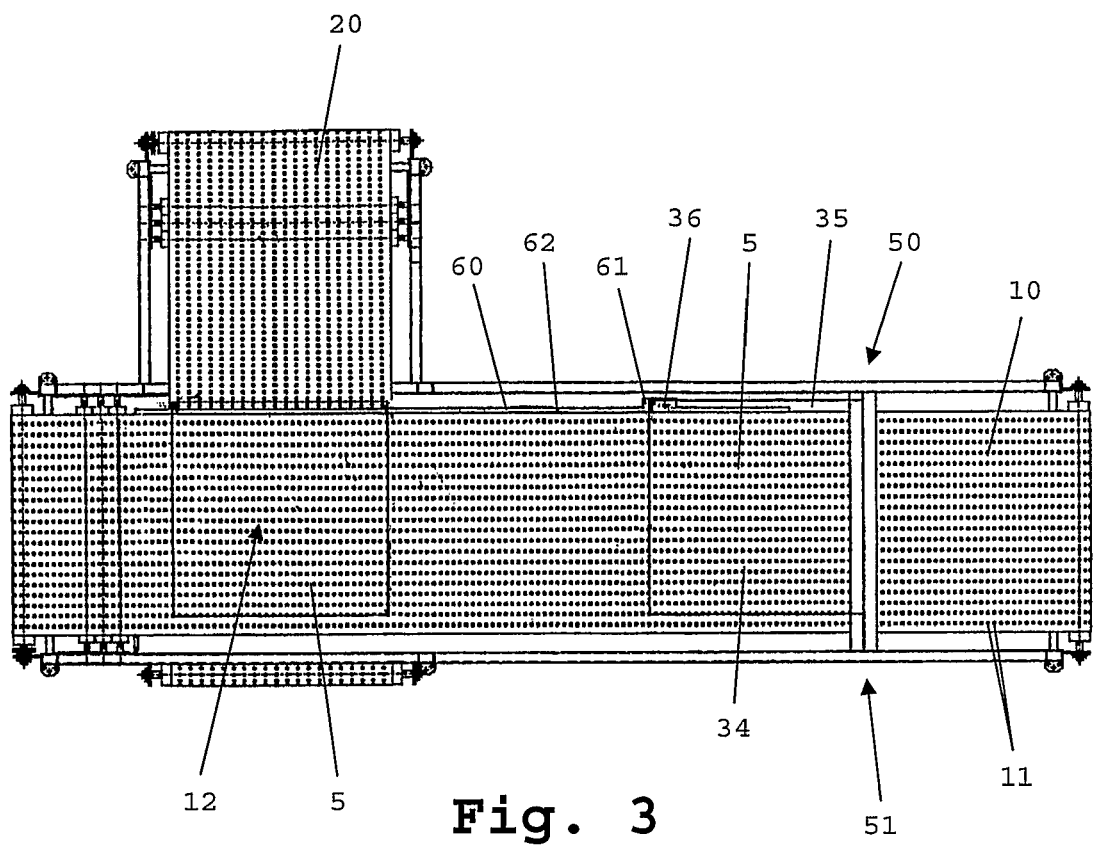
FIG. 3 is a top view of a portion of the device shown in FIG. 1.

FIGS. 1-3 show various views of a device 1 for manufacturing a crosslaid fiber web 2 according to a preferred embodiment of the present invention.

The crosslaid fiber web 2 is manufactured on the basis of two longitudinal fiber webs 3, 4. For sake of clarity, the longitudinal fiber webs 3, 4 are only shown in FIGS. 1 and 2. The device 1 comprises a first conveyor belt 10 for transporting a first longitudinal fiber web 3 in a first direction and a second conveyor belt 20 for transporting a second longitudinal fiber web 4 in a second direction. In the shown example, the conveyor belts 10, 20 extend at an angle of 90° with respect to each other, which does not alter the fact that the conveyor belts 10, 20 may be oriented at another angle with respect to each other. The second conveyor belt 20 adjoins a side of the first conveyor belt 10.

Usually, the longitudinal fiber webs 3, 4 are positioned on reels 31, 41, which are rotated during operation of the device 1, wherein the longitudinal fiber webs 3, 4 are reeled off of the reels 31, 41. For the purpose of receiving and rotating the reels 31, 41, the device 1 comprises unreeling units 32, 42. Furthermore, the device 1 comprises guiding devices 33, 43 for guiding the longitudinal fiber webs 3, 4 in the direction of the conveyor belts 10, 20.

The device 1 comprises a cutting unit 50 having a knife 51 for cutting off segments 5 of the first longitudinal fiber web 3 which is located on the first conveyor belt 10. The first longitudinal fiber web 3 is moved under the knife 51, while the knife 51 is regularly activated to cut off the segments 5 of the first longitudinal fiber web 3. As an illustration, in FIG. 3, two segments 5 are shown, wherein the segments 5 are depicted as being transparent, so that underlying portions of the device 1 are visible.

Figure 4:
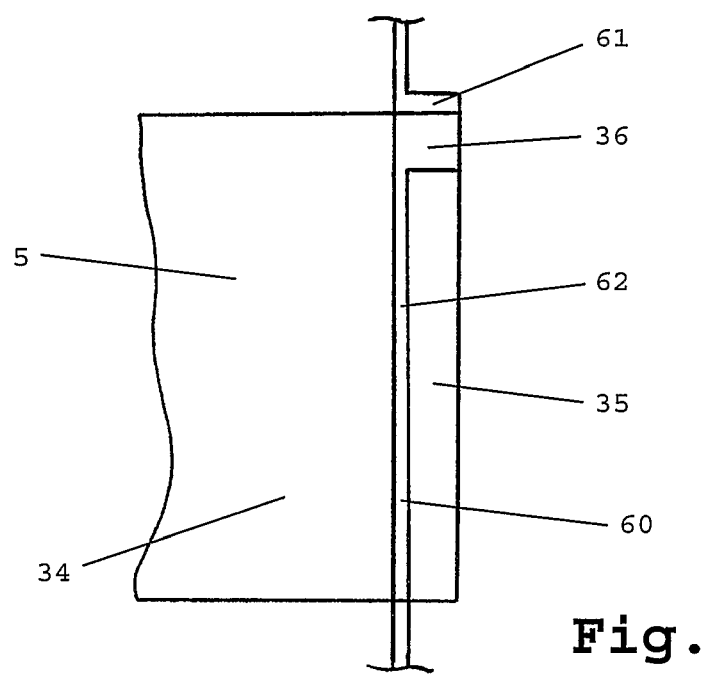
FIG. 4 is a diagrammatical top view of a portion of a guiding belt of the device shown in FIG. 1 and a portion of a cut-off segment of a longitudinal fiber web.

According to an important aspect of the present invention, the device 1 comprises a guiding belt 60, which extends parallel with respect to the first conveyor belt 10, along the side of the first conveyor belt 10 which is adjoined by the second conveyor belt 20. In FIG. 4, a portion of the guiding belt 60 is shown in more detail. Also, in FIG. 4, a portion of a segment 5 is shown, which, for sake of clarity, is depicted as being transparent. The guiding belt 60 comprises a number of portions 61 protruding in a sideward direction, at the location of which the guiding belt 60 is broadened. In FIGS. 3 and 4, a relatively narrow part of the guiding belt 60 is indicated by means of the reference numeral 62.

The device 1 comprises a third conveyor belt 70, which extends above a portion of the second conveyor belt 20, and which is movable in the second direction. For sake of clarity, the third conveyor belt 70 is only shown in FIG. 2. Furthermore, the device 1 comprises a laminating unit 80 for interconnecting the segments 5 and the second longitudinal fiber web 4.

In the following, a description will be given of the way in which the manufacturing process of a crosslaid fiber web 2 takes place when the device 1 according to the present invention is used.

The first longitudinal fiber web 3 is laid down on the first conveyor belt 10 in such a way that only a retainer area 34 of the first longitudinal fiber web 3 is supported by the first conveyor belt 10, and that a conveyance area 35 of the first longitudinal fiber web 3 projects with respect to the side of the first conveyor belt 10. The same goes for the segments 5 which are cut off of the first longitudinal fiber web 3.

The first longitudinal fiber web 3 is retained by the first conveyor belt 10 at the location of the retainer area 34. In the shown example, the first conveyor belt 10 comprises a plurality of openings 11, so that the first conveyor belt 10 is capable of exerting a suction force on the first longitudinal fiber web 3 when an underpressure is prevailing at an uncovered side of the openings 11. In a similar manner, the segments 5 are retained by the first conveyor belt 10 at the location of the retainer area 34.

The first longitudinal fiber web 3 is moved to the cutting unit 50 by the first conveyor belt 10. At the location of the cutting unit 50, the knife 51 is continually used for cutting off a segment 5 of the first longitudinal fiber web 3.

Starting from the cutting unit 50, when the cut-off segments 5 are transported further by the first conveyor belt 10, at least a portion of the conveyance area 35 is supported by the guiding belt 60. In particular, a portion 36 of the conveyance area 35 of the segments 5, which is a front portion 36 in a direction of movement of the first conveyor belt 10, is completely supported by a protruding part 61 of the guiding belt 60. The guiding belt 60 is adapted to retaining the conveyance area 35 of the segments 5, for example on the basis of static electricity.

During a movement of a cut-off segment 5 from the cutting unit 50 to a conveyance region 12 in which the segment 5 is in line with the second conveyor belt 20, the guiding belt 60 moves at a speed which is substantially equal to the speed of the first conveyor belt 10, so that the conveyance area 35 of the segment 5 remains supported in the above-described way. When the segment 5 has reached the conveyance region 12, the first conveyor belt 10 is stopped and the segment 5 may be conveyed to the second conveyor belt 20.

While the segment 5 is still retained by the first conveyor belt 10, the guiding belt 60 moves further, so that the protruding part 61 of the guiding belt 60 moves from under the conveyance area 35 of the segment 5, wherein the front portion 36 originally supported by the protruding part 61 of the guiding belt 60 ends up on the second longitudinal fiber web 4 on the second conveyor belt 20. Subsequently, the suction force exerted by the first conveyor belt 10 on the segment 5 is released, so that the segment 5 is no longer retained by the first conveyor belt 10, and is capable of moving along with the second conveyor belt 20. In the shown example, the second conveyor belt 20 retains the segment 5 in a similar manner as the first conveyor belt 10 does.

During the conveyance of the segment 5 from the first conveyor belt 10 to the second conveyor belt 20, the segment 5 is guided by the third conveyor belt 70, at an upper side. In order to be capable of pressing the segment 5 on the second longitudinal fiber web 4, the second conveyor belt 20 and the third conveyor belt 70 are moved with respect to each other, wherein the second conveyor belt 20 and the third conveyor belt 70 move toward each other, until just a small distance is present between said conveyor belts 20, 70. It is possible that only the third conveyor belt 70 is moved, but it is also possible that both the third conveyor belt 70 and the second conveyor belt 20 are moved, for example. A larger distance between the second conveyor belt 20 and the third conveyor belt 70 is desirable when the segment 5 is located in the conveyance region 12 and is conveyed to the second conveyor belt 20, in order to prevent a situation in which the conveyance of the segment 5 from the first conveyor belt 10 to the second conveyor belt 20 is hindered.

The entirety of the second longitudinal fiber web 4 and the segments 5 laid down thereon is moved further by the second conveyor belt 20, after which said entirety is made to be a crosslaid fiber web 2 in the laminating unit 80, because of the fact that the second longitudinal fiber web 4 and the segments 5 laid down thereon are definitively connected to each other in the laminating unit 80. The crosslaid fiber web 2 is moved out of the laminating unit 80, toward a reeling unit 56, via a guiding device 55. In the reeling unit 56, a roller 57 is present, wherein the crosslaid fiber web 2 is reeled on the roller 57. The roller 57 and the crosslaid fiber web 2 reeled thereon is an end product which is obtained on the basis of the reel 31 having the first longitudinal fiber web 3 reeled thereon and the reel 41 having the second longitudinal fiber web 4 reeled thereon, and which finds many applications.

The guiding belt 60 plays an important role in obtaining a situation in which the conveyance of the segments 5 from the first conveyor belt 10 to the second conveyor belt 20 takes place in a proper manner. By the application of the guiding belt 60, it is guaranteed that the segments 5 end up on the second longitudinal fiber web 4 in a completely planar fashion. Without the presence of the guiding belt 60, there is an actual chance that a portion of the conveyance area 35, in particular the front portion 36 of the conveyance area 35 curls, and that the segments 5 are not placed on the second longitudinal fiber web 4 in a completely outstretched condition. In stead, the curled portion of the segments 5 can be definitively folded when said portion is firmly pressed on the underlying second longitudinal fiber web 4 and is connected to this longitudinal fiber web 4 in the laminating unit 80.

In order to guarantee that the guiding belt 60 is not capable of hindering the conveyance from the first conveyor belt 10 to the second conveyor belt 20, it is important that a distance between two successive protruding parts 61 of the guiding belt 60 is larger than a dimension of the segments 5 in the first direction.

Advantageously, the guiding belt 60 is adapted to guaranteeing that the conveyance area 35 and the retainer area 34 of the segments 5 extend at a substantially equal level. In view of this, the guiding belt 60 is arranged with respect to the first conveyor belt 10 in such a way that a supporting surface of the guiding belt 60 and a supporting surface of the first conveyor belt 10 are substantially at the same level.

Within the scope of the present invention, various possibilities for the practical realization of the various components of the device 1 exist.

The first conveyor belt 10, which serves for supporting and transporting the first longitudinal fiber web 3 and the cut-off segments 5, may be adapted to retaining the first longitudinal fiber web 3 and the segments 5 by means of a suction force, as has already been described in the foregoing. That does not alter the fact that the first conveyor belt 10 may be adapted to retaining the first longitudinal fiber web 3 and the segments 5 in another suitable way, wherein, in general, the first conveyor belt 10 is adapted to exerting an attractive force on at least a portion of an under surface of the first longitudinal fiber web 3 and the segments 5. In a similar manner, the second conveyor belt 20, which serves for supporting the second longitudinal fiber web 4 and the segments 5 laid down thereon, may be adapted to retaining the longitudinal fiber web 4 and the segments 5 laid down thereon in another way than by means of a suction force.

At least one of the first conveyor belt 10 and the second conveyor belt 20 can be divided in two or more parts, wherein ends of the parts adjoin each other. For example, the first conveyor belt 10 may comprise two parts, wherein sides of the parts which are adjoining each other are present at the location of the cutting unit 50. An advantage of the division of the conveyor belts 10, 20 is that the parts may be moved at different speeds.

The guiding belt 60 may be realized as a steel strip which is capable of retaining at least the front portion 36 of the conveyance area 35 of the segments 5 on the basis of static electricity. It is also possible that the guiding belt 60 is realized as a textile strip having standing hairs, for example. In stead of a belt 60, it is also possible to apply movably arranged suction cups, for example, for retaining at least a portion of the conveyance area 35 of the segments 5.

It is not necessary that the device 1 comprises a laminating unit 80 for interconnecting the second longitudinal fiber web 4 and the segments 5. For example, it is also possible that an upper surface of the second longitudinal fiber web 4 is provided with a self-adhesive layer of glue. In that case, a connection between the segments 5 and the second longitudinal fiber web 4 is established as soon as the segments 5 contact the second longitudinal fiber web 4. In such case, it is not necessary to apply a third conveyor belt 70 for pressing the segments 5 against the second longitudinal fiber web 4. In stead, it should be sufficient to apply a roller or the like.

Furthermore, it is not necessary that the segments 5 are placed from the first conveyor belt 10 directly on the second longitudinal fiber web 4. For example, it is also possible that the segments 5 end up directly on the second conveyor belt 20, and that the second longitudinal fiber web 4 is subsequently laid down on the segments 5, from an upper side.

It will be clear to a person skilled in the art that the scope of the present invention is not limited to the examples discussed above, but that several amendments and modifications thereof are possible without deviating from the scope of the invention as defined in the appended claims.

In the foregoing, the invention is described in the context of manufacturing a crosslaid fiber web 2. That does not alter the fact that the invention is also applicable in other fields. In any case, the invention offers a useful solution in situations in which a sheet needs to be successively moved by two different carriers, wherein, for the purpose of the conveyance from a first of the carriers to a second of the carriers, the sheet projects with respect to the first of the carriers, and wherein the projecting portion of the sheet curls in an upward or in a downward direction, as a result of which the sheet does not end up on the second of the carriers in a completely outstretched condition.

According to the present invention, guiding means such as a guiding belt 60 are provided for guiding at least a portion 36 of the projecting conveyance area 35 of the sheet during the time that the sheet is transported to the conveyance region 12 by the first conveyor belt 10. The guiding function of the guiding means may be realized by arranging the guiding means with respect to the first conveyor belt 10 in such a way that these means are capable of supporting said portion 36 of the conveyance area 35 of the sheet. Within the scope of the present invention, alternatives of the guiding means are feasible, for example guiding means which are adapted to retaining the portion 36 of the conveyance area 35, from an upper side.

In the foregoing, a device 1 for manufacturing a crosslaid fiber web 2 has been described, which comprises a first conveyor belt 10 and a second conveyor belt 20. The conveyor belts 10, 20 are oriented in two different directions, wherein the second conveyor belt 20 adjoins a side of the first conveyor belt 10. During operation of the device 1, the first conveyor belt 10 transports longitudinal fiber web segments 5, which are conveyed to the second conveyor belt 20 in a conveyance region 12.

During transportation by the first conveyor belt 10, a conveyance area 35 of the longitudinal fiber web segments 5 projects with respect to the side of the first conveyor belt 10. The device comprises a guiding belt 60 for supporting a portion 36 of this conveyance area 35, in order to guarantee that, in the conveyance region 12, the longitudinal fiber web segments 5 may be conveyed to the second conveyor belt 20 in a completely outstretched fashion.

According to an important aspect of the present invention, the guiding device 33 for guiding the first longitudinal fiber web 3 at a position between the reel 31 and the first conveyor belt 10 comprises a movably arranged guiding member 37 having two rotatably arranged guiding rollers 38, as well as a frame 39 for supporting and guiding the guiding member 37. In the shown example, the guiding member 37 is movable in a horizontal direction.

The guiding device 33 also comprises controlling means (not shown) for determining and setting a position of the guiding member 37 with respect to the frame 39. In the process, a basic assumption is that the tension in the first longitudinal fiber web 3 needs to remain at a certain minimum level. On the one hand, the controlling means are adapted to measuring the tension in the first longitudinal fiber web 3, and, on the other hand, to controlling moving means (not shown) which are adapted to realizing a movement of the guiding member 37 with respect to the frame 39, on the basis of a comparison of a measured value of the tension and a required minimum value of the tension. In a practical embodiment, the moving means comprise an electric motor, for example.

Due to the fact that the guiding member 37 of the guiding device 33 is movable in the horizontal direction, it is possible to compensate for possible differences of the speed of the first longitudinal fiber web 3 in the vicinity of the reel 31 and on the first conveyor belt 10. By keeping the tension in the first longitudinal fiber web 3 at a certain level, sagging of the first longitudinal fiber web 3 is prevented, which happens in the path between the reel 31 and the guiding device 33, for example, when the guiding member 37 would have a fixed position and when the speed of the first longitudinal fiber web 3 would be higher at the reel 31 than on the first conveyor belt 10. Also, by the application of the guiding device 33, it is prevented that reeling off of the first longitudinal fiber web 3 of the reel 31 needs to stop when a segment 5 is cut off of the first longitudinal fiber web 3 on the first conveyor belt 10 and the first longitudinal fiber web 3 consequently does not move, and needs to start again when, for the purpose of cutting off a following segment 5, the first longitudinal fiber web 3 moves further on the first conveyor belt 10 over the distance of a segment 5. In stead, the reel 31 may rotate continuously at a more or less constant speed.

An important feature of the shown guiding device 33 is that this device 33 contacts exclusively one side of the first longitudinal fiber web 3, while another side of the first longitudinal fiber web 3 remains free from contact. The first longitudinal fiber web 3 forms a loop around the guiding member 37, as it were, wherein both guiding rollers 38 contact the first longitudinal fiber web 3 at an inner side of the loop.

Everything that has been noted in the foregoing with respect to the construction of the guiding device 33 for guiding the first longitudinal fiber web 3 at a position between the reel 31 and the first conveyor belt 10 is in a similar manner applicable to the other guiding devices 43, 55 of the device 1, i.e. the guiding device 43 for guiding the second longitudinal fiber web 4 at a position between the reel 41 and the second conveyor belt 20 and the guiding device 55 for guiding the crosslaid fiber web 2 at a position between the second conveyor belt 20 and the roller 57 of the reeling unit 56.

As a result of the fact that one side of the second longitudinal fiber web 4 remains free from contact, it is possible to provide the second longitudinal fiber web 4 with a layer of glue, for example, in the vicinity of the reel 41. Applying glue to the second longitudinal fiber web 4 is an advantageous option, because as a result of doing so, the laminating unit 80 for connecting cut-off segments 5 of the first longitudinal fiber web 3 and the second longitudinal fiber web 4 may be omitted. The fact that the guiding device 43 enables the reel 41 to rotate at a more or less constant speed leads to a situation in which it is possible to evenly apply the glue to the second longitudinal fiber web 4.

Figure 5:
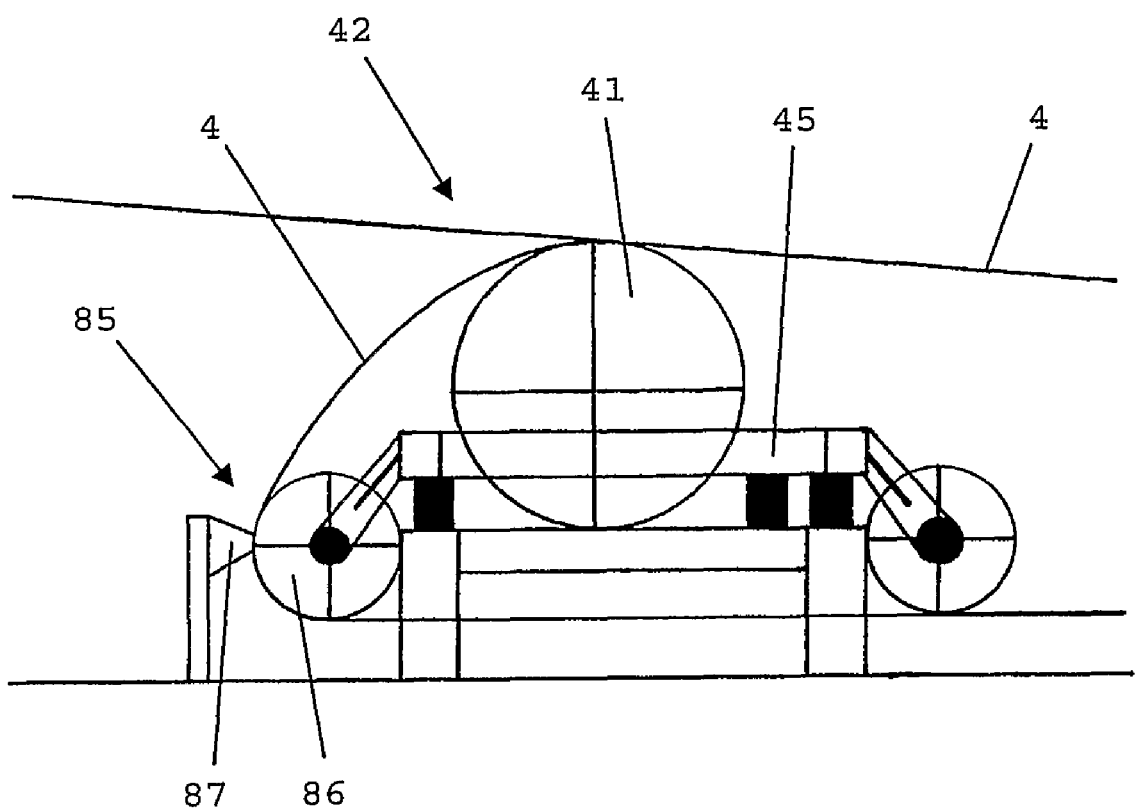
FIG. 5 shows an alternative of detail A in FIG. 2.

In FIG. 5, a gluing device 85 is diagrammatically shown, which is arranged near the unreeling unit 42. The gluing device 85 comprises a glue roller 86 for guiding the second longitudinal fiber web 4 and a glue spray 87 for applying the glue on this longitudinal fiber web 4. Preferably, a central shaft of the glue roller 86 is connected to a frame 45 of the unreeling unit 42, as shown in FIG. 5. The second longitudinal fiber web 4 is led through between the glue roller 86 and the glue spray 87, so that it is supported at one side by the glue roller 86 during a movement of the reel 41, and it is provided with glue at another side. It is evident that the glue spray 87 is designed such that at least a substantial portion of the width of the second longitudinal fiber web 4 is covered by the glue spray 87. In an alternative embodiment, the glue spray 87 is movably arranged.

When the segments 5 of the first longitudinal fiber web 3 are connected to the second longitudinal fiber web 4 by means of glue, a crosslaid fiber web 2 having better mechanical characteristics than when the segments 5 of the first longitudinal fiber web 3 are connected to the second longitudinal fiber web 4 by means of laminating is obtained. In a laminating process, thermoplastic glues are applied, while in a gluing process, reactive glues are applied, which are capable of establishing a stronger connection and which have a higher temperature resistance. Moreover, the application of glue offers better possibilities for adapting the characteristics of the crosslaid fiber web 2 to be manufactured to the final use thereof.

The application of the guiding device 33 having the movably arranged guiding member 37 is not limited to guiding longitudinal fiber webs 3, 4 or crosslaid fiber webs 2. Dependent of the application, the guiding member 37 may be movable in another direction than the horizontal direction, for example in a vertical direction. However, in such a case, measures need to be taken for eliminating the influence of the weight of the guiding member 37 on the tension in the web to be guided.

It is not necessary that the guiding member 37 of the guiding device 33 comprises two guiding rollers 38; the number of guiding rollers 38 may also be one or more than two.

When a device according to the present invention having a laminating unit 80 for interconnecting the segments 5 and the second longitudinal fiber web 4 as shown in FIG. 2 is applied, it is advantageous when the upper surface of the second longitudinal fiber web 4 is activated in a manner known per se to retain the segments 5 by means of static electricity. Because it is realized in this way that the segments 5 are retained by the second longitudinal fiber web 4, there is no danger of the segments 5 falling off of the second longitudinal fiber web 4 as soon as the second longitudinal fiber web 4 and the segments 5 present thereon move along the guiding device 55. Therefore, in such a case, it is possible to have an embodiment of the device in which the laminating unit 80 is positioned between the guiding device 55 and the reeling unit 56. Due to the action of the guiding device 55 having the movably arranged guiding member, it is possible that the entirety of the second longitudinal fiber web 4 and segments 5 moves between the guiding device 55 and the reeling unit 56 at a more or less constant speed. Hence, the laminating process may be performed in a continuous and even fashion. Such a laminating process is preferred with respect to a process which needs to take place in a discontinuous fashion.

It is not necessary that the segments 5 are retained by the second longitudinal fiber web 4 on the basis of static electricity; within the scope of the present invention, any surface force may be applied.

The invention claimed is:

1. A method for transporting a sheet, comprising:
   moving the sheet in a first direction by applying a first carrier which is movable in the first direction and which is capable of retaining the sheet by means of a surface force, wherein a retainer area of the sheet is retained by the first carrier and a conveyance area of the sheet projects with respect to the first carrier;
   conveying the sheet from the first carrier to a second carrier which is movable in a second direction and which is capable of retaining the sheet by means of a surface force, wherein the sheet is put in a conveyance position by the first carrier, in which position the complete conveyance area overlaps the second carrier; and
   moving the sheet in the second direction by applying the second carrier;
   wherein, continuously during the movement of the sheet in the first direction through to the conveyance position, guidance of a guidance area of the sheet, which comprises at least a portion of the conveyance area of the sheet, takes place by applying guiding means, which guidance is cancelled only when the sheet has reached the conveyance position;
   wherein the guiding means are movable in the first direction; and
   wherein the cancellation of the guidance of the guidance area of the sheet takes place by realizing a speed difference of the guiding means and the first carrier.

2. A method according to claim 1, wherein the guiding means are capable of retaining the guidance area of the sheet by means of a surface force.

3. A method according to claim 1, wherein the guiding means are adapted to guaranteeing that the guidance area of the sheet and the retainer area of the sheet extend at a substantially equal level.

4. A method according to claim 1, wherein, during the time that guidance of the guidance area of the sheet takes place, a speed at which the guiding means are moved is substantially equal to a speed at which the first carrier is moved.

5. A method according to claim 1, wherein the guidance area comprises a portion of the conveyance area of the sheet, which is a front portion in said direction.

6. A device for transporting a sheet comprising:
   a movable first carrier which is adapted to moving sheets in a first direction and retaining sheets by means of a surface force;
   a movable second carrier which is adapted to moving sheets in a second direction and retaining sheets by means of surface force, wherein the first carrier and the second carrier adjoin each other in a close-fitting fashion at the location of a conveyance region; and
   guiding means for guiding a portion of sheets which are retained by the first carrier, as far as in the conveyance region;
   wherein the guiding means are movable in the first direction and comprise an endless conveyor belt, and
   wherein the conveyor belt comprises at least two different types of areas, wherein at the location of one type of area, a dimension of the conveyor belt in a transverse direction is different than at the location of another type of area, such that the conveyor belt comprises a number of portions protruding in a sideward direction, at the location of which the conveyor belt is broadened, while the other part of the conveyor belt is narrower than the protruding portions.

7. A device according to claim 6, wherein the guiding means are adapted to retaining sheets by means of a surface force.

8. A device according to claim 6, wherein contacting areas of the first carrier and contacting areas of the guiding means, which are adapted to contacting the sheets, are located on a substantially equal level.

9. A device according to claim 6, further comprising a frame for receiving a reel having a web which is destined to receive the sheets and to be connected to the sheets; and a gluing device for applying glue to the web.

10. A device for transporting a sheet comprising:
    a movable first carrier that is adapted to moving the sheet in a first direction and that is capable of retaining the sheet by means of a surface force, wherein a retainer area of the sheet is retained by the first carrier and a conveyance area of the sheet projects with respect to the first carrier;

a movable second carrier that is adapted to moving the sheet from the first carrier in a second direction and that is capable of retaining the sheet by means of a surface force, wherein the sheet is put in a conveyance position by the first carrier, in which position the complete conveyance area overlaps the second carrier;

moving means to move the sheet in the second direction by applying the second carrier; and guiding means for guidance of a guidance area of the sheet, which comprises at least a portion of the conveyance area of the sheet, continuously during the movement of the sheet in the first direction through to the conveyance position, which guidance is cancelled only when the sheet has reached the conveyance position;

wherein the guiding means are movable in the first direction; and wherein the cancellation of the guidance of the guidance area of the sheet takes place by realizing a speed difference of the guiding means and the first carrier.

* * * * *